United States Patent [19]
Shamlian et al.

[11] 3,888,127
[45] June 10, 1975

[54] PORTABLE UNDERWATER INDICATING INSTRUMENT FOR DIVERS

[75] Inventors: Ralph B. Shamlian, Belmont; Ashley J. Hollingsworth, Atherton, both of Calif.

[73] Assignee: Farallon Industries, Inc., Belmont, Calif.

[22] Filed: Apr. 18, 1974

[21] Appl. No.: 462,099

Related U.S. Application Data

[63] Continuation-in-part of Ser. No. 305,232, Nov. 10, 1972.

[52] U.S. Cl. ............... 73/431; 73/300; 73/389; 73/418; 73/432 A
[51] Int. Cl. ............................................ G01l 19/00
[58] Field of Search......... 73/300, 299, 388 R, 389, 73/432 R, 432 A, 418, 412, 431; 248/27

[56] References Cited
UNITED STATES PATENTS

| | | | |
|---|---|---|---|
| 2,773,388 | 12/1956 | Prosser | 73/431 |
| 3,026,072 | 3/1962 | Hughes | 73/431 |
| 3,187,572 | 6/1965 | Harland | 73/300 |
| 3,241,365 | 3/1966 | Schroeder | 73/412 |
| 3,528,290 | 9/1970 | Lecoco | 73/300 |
| 3,715,927 | 2/1973 | Grant | 73/389 |

*Primary Examiner*—Donald O. Woodiel
*Attorney, Agent, or Firm*—Lowhurst, Aine & Nolan

[57] ABSTRACT

A portable underwater indicating instrument includes means for measuring a quantity of interest, such as time, pressure, temperature, magnetic field direction, or the like, and indicating means for indicating to the diver the measured quantity. The indicating means includes a dial having a face portion for viewing by the diver through a transparent window of a fluid tight housing. The dial face includes a fluorescent background with contrasting indicia of the measured quantity thereon. A light is provided in the housing for illuminating the fluorescent background portion of the dial. A manually operated switch controls energization of the light. The fluorescent background improves the visibility of the dial and also allows the lighted fluorescent dial to serve as an emergency light source. In a preferred embodiment, a pair of back-to-back pressure gauges are included within a common housing, one of the pressure gauges measures the diving depth and the second gauge measures the air pressure in the diver's scuba tank as communicated to the gauge over a flexible hose.

15 Claims, 13 Drawing Figures

PATENTED JUN 10 1975

SHEET 1

Fig_1

Fig_2

Fig_3

Fig_4

Fig_7

Fig_8

Fig_9

Fig_10

Fig_11

Fig_12

Fig_13

PORTABLE UNDERWATER INDICATING INSTRUMENT FOR DIVERS

RELATED CASES

The present invention is a continuation-in-part application of parent application U.S. Ser. No. 305,232 filed Nov. 10, 1972, and assigned to the same assignee as the present invention.

BACKGROUND OF THE INVENTION

Heretofore, scuba divers have utilized underwater measuring instruments such as pressure gauges, depth gauges, compasses, water temperature gauges and the like for measuring and indicating quantities to the diver. These underwater instruments have generally included a watertight housing containing the device for measuring the quantity and an indicating device such as a dial and pointer for viewing by the diver through a window portion of the housing. The face of the indicating dial was generally black or of a dark color with fluorescent indicia such as numerals indicating the quantity being measured.

While such a prior art indicating device is useful at relatively shallow depths where a fair amount of ambient light is available, the device is generally unsuited for use in low visibility conditions, such as encountered in murky water or at substantial depths, as the available light is insufficient to provide sufficient energization of the fluorescent indicia to provide sufficient visibility to the diver for accurate reading. Of course, the dial could be illuminated with a flashlight but this requires that the diver carry with him a separate light and if that light fails or is lost or misplaced he is unable to read the various quantities being measured.

It is also known from the prior art that the dial of a wristwatch may be illuminated for ease of reading by incorporating a miniature light bulb in the watch glass cover. The filament of the bulb is energized with current supplied from batteries carried within a compartment of the watch band and controlled by means of a pushbutton switch located in the watch band for periodically illuminating the watch dial to facilitate reading in the dark. Such a device is disclosed and claimed in U.S. Pat. No. 3,018,614 issued Jan. 30, 1962. However, in this prior art device, the numerals are painted witih luminous paint in the conventional manner.

SUMMARY OF THE PRESENT INVENTION

The principal object of the present invention is the provision of improved portable underwater indicating instruments for divers.

In one feature of the present invention, a portable underwater indicating instrument includes a common housing for housing first and second pairs of measuring and indicating devices for measuring and indicating first and second quantities of interest to the diver, and wherein each of the indicating means includes a face portion facing outwardly of the housing for viewing by the diver.

In another feature of the present invention, a portable underwater indicating instrument to be carried by the diver includes a common housing for housing a pair of pressure measuring and indicating devices and wherein one of the pressure measuring and indicating devices includes a hose for providing a flexible fluid for indicating to the diver the pressure of breathing fluid remaining in his tank.

In another feature of the present invention, the common housing is made of a pliable resilient plastic material for containing and retaining encapsulated measuring instruments for use by the diver.

In another feature of the present invention, a battery housing structure includes a portion having a light bulb imbedded therein as an integral part thereof for illuminating the dial face of portable diving instruments coupled thereto.

Other features and advantages of the present invention will become apparent upon a perusal of the following specification taken in connection with the accompanying drawings.

DESCRIPTION OF THE PREFERRED EMBODIMENTS

Figure 1:
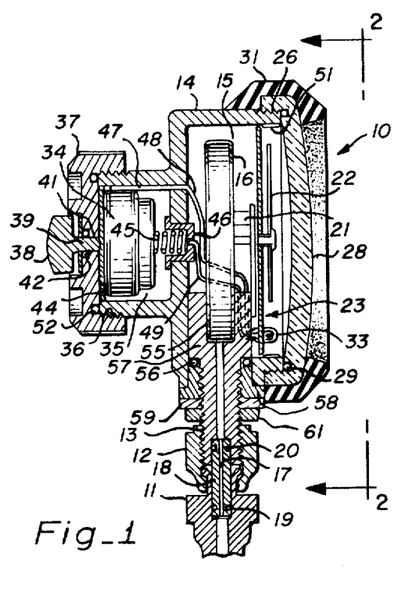
FIG. 1 is a longitudinal sectional view of a pressure gauge assembly incorporating features of the present invention.
Figure 2:
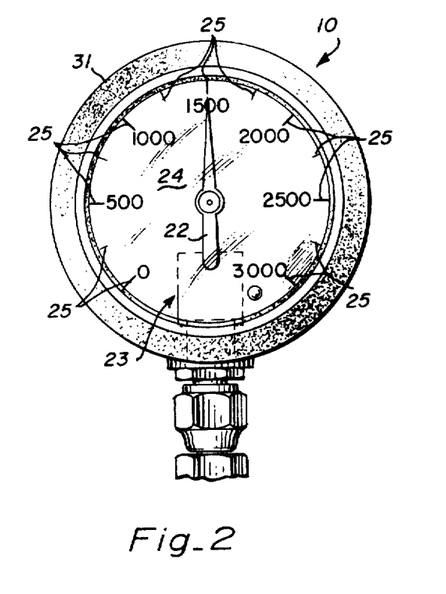
FIG. 2 is a front view of the structure of FIG. 1 taken along line 2—2 in the direction of the arrows.

Referring now to FIGS. 1 and 2, there is shown a pressure gauge assembly 10 incorporating features of the present invention. The pressure gauge 10 is for the purpose of indicating to the diver the pressure of his breathing fluid remaining in his scuba tank, now shown. The pressure gauge 10 is connected to the scuba tank via the intermediary of a flexible pressure hose 11 having a fitting 12 threadably mating with a threaded nipple 13 of the gauge 10. The hose 11 is of any convenient length as of 2 feet such that the diver can pull the gauge 10 into his view for observing the pressure remaining in his tank.

The pressure gauge 10 includes a gauge housing structure 14, as of polycarbonate resin, marketed under the trademark LEXAN by General Electric. The housing 14 includes a generally cup-shaped main compartment 15 for housing the bourdon tube 16 of a conventional high-pressure gauge. The inside of the bourdon tube 16 is connected in fluid communication with the nipple 13 and the hose 11 via an air spool 17 which comprises a hollow tubular member 18 having O-ring seals 19 and 20 at opposite ends thereof for making a rotary seal between the inside wall of the nipple 13 and the outside wall of the spool 17 at one end and a similar seal between the inside wall of the hose 11 and the outside wall of the spool 17 at the other end. In this manner, the gauge housing and nipple may be rotated relative to the hose 11 to facilitate viewing of the gauge 10 without kinking of the flexible hose 11.

The output of a bourdon tube 16 is coupled via the conventional gear mechanism 21 to an indicator needle 22 pivotally mounted over a fixed dial face 23. The dial face includes a fluorescent background portion 24 overprinted with numeric and scale mark indicia 25. The fluorescent background portion 24 is preferably made of fluorescent vinyl, marketed under the trademark PERAGLOW by Mactac Corporation of Los Angeles. The fluorescent background preferably fluoresces in a nearly white color, whereas the indicia 25 and pointer 22 are painted or otherwise formed of a dark or black material such as black point to form a high light contrast with the background 24. In a typical example, dial face 23 is circular with a diameter of 2.0 inches and provides 120 picolumins of fluorescent light output after having been fully charged for two minutes with illumination.

The lip of the cup-shaped compartment 15 is externally threaded at 26 for threadably mating with the internal threads 27 of an outwardly dished transparent lens 28, as of transparent polycarbonate material. An O-ring seal 29 is retained within a groove within the lens for making a fluid tight seal between the lens 28 and the housing 14. A ring-shaped rubber boot 31 is snapped in place over the outer periphery of the lens 28 and housing 14 as a shock protector for the lens 28 and housing 14. A miniature incandescent lamp 33 is mounted in the face of the dial 23 for flooding the dial face 23 with illumination for charging the fluorescent background material 24. In a typical example, the miniature lamp 33 comprises an incandescent filament lamp rated for 190 milliamps of current at 3 volts.

The lamp 33 is energized with current from a three volt alkaline battery 34 contained within a cup-shaped battery compartment 35 is externally threaded at 36 to receive an internally threaded cap 37, as of polycarbonate material. A depressible actuating button 38, as of stainless steel, is centrally mounted of the cap 37 and includes a central extension 39 protruding through a hole 41 in the cap 37. An O-ring 42 is retained within a groove, circumscribing the wall of the hole 41, via a retaining washer 43, as of polycarbonate, material sonically bonded to the cap 37.

A brass washer 44 is bonded to the inner end of the button 38 and the washer bears against one terminal of the battery 34 for making electrical contact thereto. An electrically conductive spring 45 is retained within a retaining cup 46 and makes electrical contact to the other terminal of the battery and spring biases the battery 34 against the washer 44. An electrical contact bar 47 is disposed along the sidewall of the battery compartment 35 and extends at one end through the end wall of the battery compartment into the pressure gauge compartment 15 where it is connected via wire 48 to one terminal of the lamp 33. The other terminal of the lamp 33 is connected to the spring 46 via wire 49. An O-ring 52 seals the battery compartment cap 37 to the battery housing 35.

The end of the contact bar 47, which is disposed adjacent the washer 44 is spaced from the washer by, for example, 1/16 of an inch such that the electrical circuit interconnecting the battery 34 with the lamp 33 is normally in the off position, i.e., disconnected. However, upon manual depression of switch button 38, the washer 44 is pushed into contact with the end of the contact bar 47 thereby completing the electrical circuit and energizing the lamp 33 for charging the fluorescent background 24 of the dial 23.

A ring-shaped light reflective element 51 is disposed circumscribing the outer periphery of the dial 23 between the dial 23 and the lens 28 for reflecting the light generated by the lamp 33 and by the fluorescence of the background portion of the dial face 24 back toward the dial face to improve the visibility of the fluorescent dial face.

By the use of a luminescent sheet as the background 24, with the dial numerals and scale marks 25 printed in black, the total light emitting surface is much greater than that obtained by the prior art use of luminescent numerals on a black background. If the conventional luminescent painted numerals painted on a black background were used, the numerals could not be reactivated by means of a small low voltage bulb. The total energy absorbed over such a small area would be insufficient. However, by use of a relatively enormous luminescent background area 24 to intercept and absorb light energy, the total amount of reactivation resulting is much greater. Because of the requirements in underwater diving, this combination is particularly advantageous. More particularly, when near the surface, in high ambient light, the large luminescent area 24 provides a bright naturally activated high contrast dial 23. On deep dives, in low visibility, the momentary operation of the small bulb 33 will reactivate the dial 23 sufficiently for good contrast and visibility. In fact, the amount of illumination that can be obtained by depressing the button 38 is sufficient such that the illuminated dial face 23 may serve as an emergency light source useful for finding one's way in the dark and/or for signaling to other divers.

The nipple 13 is formed on the end of a bifurcated metallic block structure 55 disposed internally of the housing 14 for holding the bourdon tube 16. The nipple 13 is sealed to the housing 14 via and O-ring 56 disposed circumscribing a shoulder 57 at the juncture of the block portion 55 and the nipple 13. A flanged sleeve 58 circumscribes the nipple 13 and is pushed into engagement with the O-ring 57 via a nut 59 threaded over the threaded nipple 13, thereby fixedly securing the nipple and block 55 to the housing 14 in a fluid tight manner. A lock washer 61 is threaded over the nipple for locking the nut 59 in position.

Figure 3:
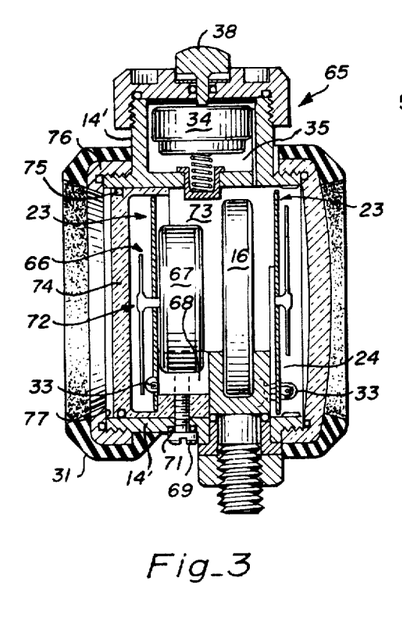
FIG. 3 is a longitudinal sectional view of an alternative pressure gauge assembly of the present invention.

Referring now to FIG. 3, there is shown an alternative pressure gauge assembly 65 of the present invention. The pressure gauge assembly 65 is substantially the same as that disclosed in FIGS. 1 and 2 with the exception that the battery compartment 35 has been moved to a top portion of the housing 14' and the housing 14', instead of being cup-shaped, is cylindrical to accommodate the tank pressure gauge assembly 16 plus a depth gauge assembly 66 disposed in back-to-back relation such that the same housing 14' may be utilized for two pressure gauge assemblies.

The depth gauge assembly 66 includes a bourdon tube 67 fixedly secured to the inside wall of the housing 14' via a bifurcated block 68 and screw 69 sealed by means of an O-ring 71. Bourdon tube 67 is of the kind wherein the inside is evacuated such that the pressure surrounding the evacuated tube 67 serves to contract the bourdon tube such as to actuate the pressure gauge needle 72 via a suitable gear train mechanism, as previously described with regard to gauge 16. The ambient fluid pressure is communicated to the depth gauge bourdon tube 67 by immersing the bourdon tube 67 in an incompressible transparent fluid, such as oil, which fills the entire chamber 73 containing both bourdon tubes 67 and 16 and the corresponding dials 23.

The lens cover 74 for the depth gauge dial 23 comprises a piston made of a transparent material, such as transparent polycarbonate resin, and sealed to the inside of the cylindrical inside wall of the housing 14' via the intermediary of an O-ring 75 disposed at the outer periphery of the piston shaped lens cover 74. A polycarbonate internally threaded retaining ring 76 is threaded over the external threads on the housing 14' and includes an inwardly directed shoulder 77 for restraining excessive outward movement of the piston lens 74. A second ring-shaped rubber boot 31 is snapped over the retaining ring 76. Both dials 23 are illuminated by lamps 33 energized from the battery 34 via the push button switch 38 in the manner as previously described with regard to the pressure gauge 10 of FIG. 1.

In operation, pressure from the diver's scuba tank is communicated to the first bourdon tube 16, as previously described with regard to FIG. 1, to yield a reading of tank pressure from its corresponding dial. THe dial is read in low visibility conditions by depressing button 38 to reactivate the fluorescent background 24 of the dial 23. The depth gauge pressure is communicated to the second bourdon tube 67 via the piston lens 74 and the incompressible fluid 73 within the central chamber. The depth is read from the corresponding dial 23 which has been illuminated and recharged by lighting lamp 33.

The advantage to the dual gauge assembly 65 is that two indicating instruments, such as gauges, may be employed in a common housing and energized with a common battery and switch 38, whereby the cost and complexity of the two gauges can be substantially reduced. In addition, the common fluid fill 73 serves as a further shock resistant mounting for the two gauge assemblies.

However, a small error in the high pressure gauge reading is occasioned by immersing the high pressure bourdon tube 16 in the depth gauge pressure transmissive fluid 73. More particularly, the error in the high gauge reading is directly proportional to depth and at a depth of 250 feet the high pressure gauge reading will read low by approximately 110 pounds, that is, the actual pressure in the scuba tank relative to sea level is 110 pounds more than indicated on the gauge. This is generally a negligible error and at any rate is a built in safety factor as the gauge indicates less pressure than actually exists in the tank.

Figure 4:
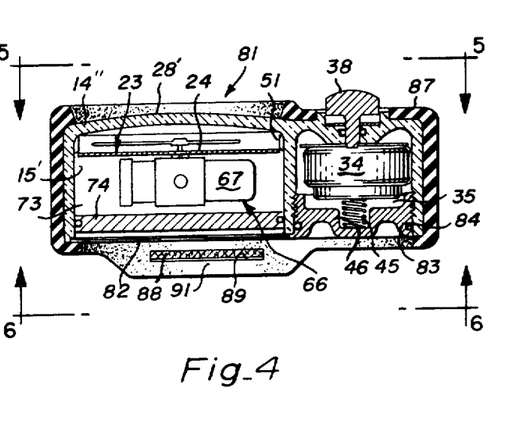
FIG. 4 is a longitudinal sectional view of a wrist-worn depth gauge assembly incorporating features of the present invention.
Figure 5:
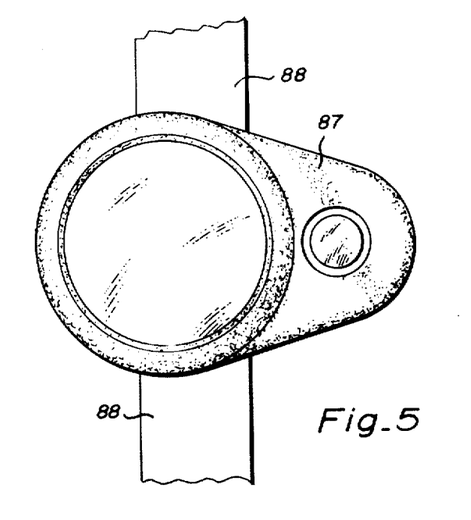
FIG. 5 is a top view of the structure of FIG. 4 taken along the line 5—5 in the direction of the arrows.
Figure 6:
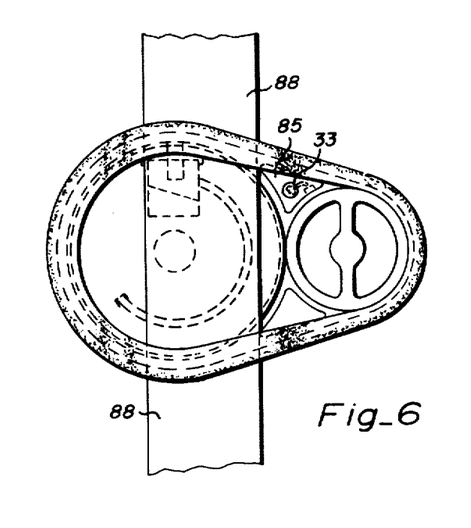
FIG. 6 is a bottom view of the structure of FIG. 4 taken along line 6—6 in the direction of the arrows.

Referring now to FIGS. 4, 5 and 6 there is shown an alternative depth gauge assembly 81 incorporating features of the present invention. The depth gauge 81 of FIG. 4—6 is substantially the same as that previously described with regard to FIG. 1-3 with the exception that the battery compartment 35 is formed in the housing 14'' in side-by-side relation with the pressure gauge compartment 15. The housing is made of a transparent polycarbonate material such that the lens portion 28', for viewing the front face of the dial 23, is formed in a one piece construction as a part of the housing 14''. The pressure transmissive pisiton 74 seals off the opposite end of the pressure chamber 15 and the chamber 15 is filled with an incompressible fluid 73. A retaining ring 82 restrains the piston 74 from being pushed out of the chamber 15.

In the battery compartment 35, the push button switch assembly is mounted in the closed end of the battery compartment 35 and the spring 45 is restrained within a central well 46 in a threaded plug 83 which is threaded into the open end of the battery compartment 35 for closing same. Plug 83 is sealed to the inside wall of the compartment via an O-ring seal 84. Lamp 33 is disposed within a hollow well 85 in the housing 14'' and light from the lamp 33 is projected through the transparent sidewall of the battery compartment 15' and through a hole in the ring mirror 51 onto the front fluorescent background 24 of the dial 23. Lamp 33 and the electrical circuit thereto is epoxied in place within the well 85 to provide a fluid tight compartment containing the lamp 33. A rubber shock resistant boot 87 is snapped in place around the housing 14''. A rubber wrist band strap 88 passs through rectangular slots 89 in depending flange portions 91 of th housing 14'' such that the pressure gauge 81 may be strapped to the wrist of the diver.

Figure 7:
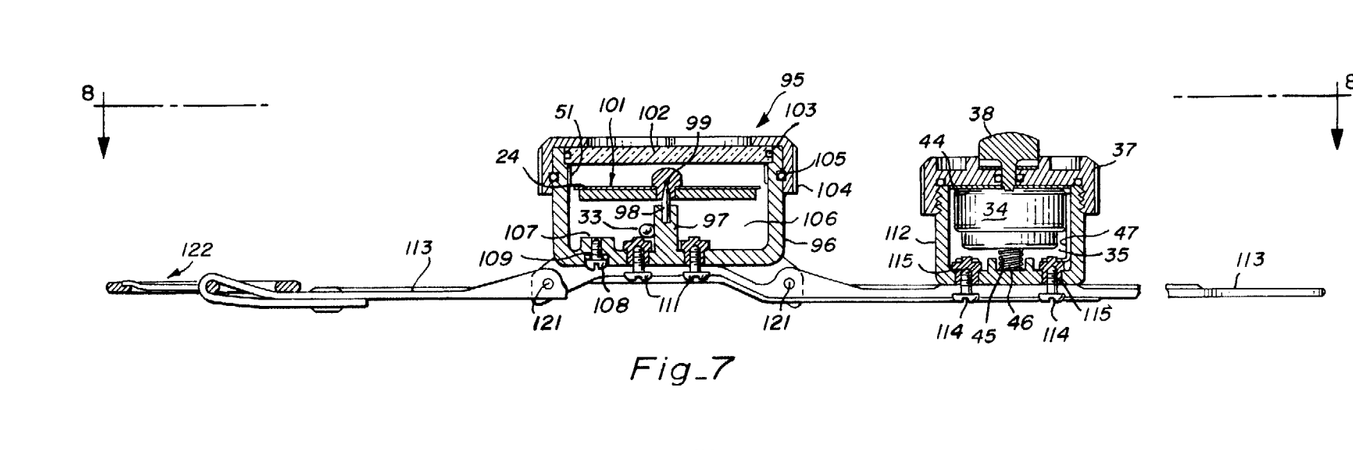
FIG. 7 is a longitudinal sectional view of a wrist-worn compass assembly incorporating features of the present invention.
Figure 8:
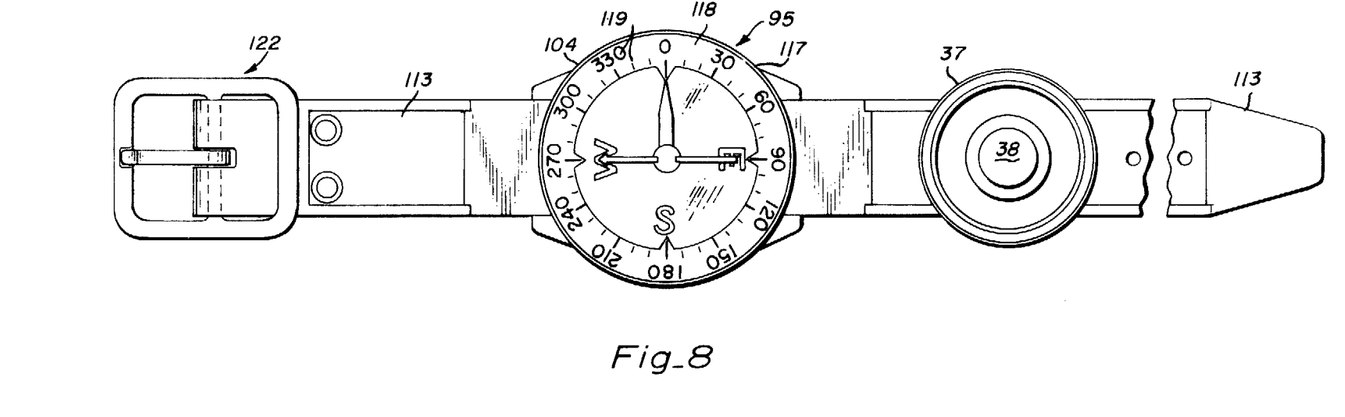
FIG. 8 is a top view of the structrue of FIG. 7 taken along line 8—8 in the direction of the arrows.

Referring now to FIGS. 7 and 8, there is shown a compass assembly 95 incorporating features of the present invention. The compass assembly 95 includes a cup-shaped compass housing 96, as of polycarbonate resin, having a centrally disposed axially directed pedestal 97 with an upwardly directed pivot point 98 onto which the jewel bearing assembly portion 99 of a compass card 101 is pivotably supported. A transparent lens 102 is sealed over the open end of the cup-shaped housing 96 via an O-ring seal 103. A rotatable cursor ring 104 is disposed about the outer periphery of the housing 96 and is locked to the housing 96 via a retaining ring 105 inserted within matching circumferential grooves in the housing 96 and cursor ring 104.

The compass housing 96 is filled with a suitable compass fluid 106, such as glycerine or kerosene. A fill hole 107 is provided in the bottom of the cup 96 and is closed by means of a screw 108 having an O-ring 109 sealing the screw 108 to the housing. A pair of electrical feedthrough members 111 provide means for making an electrical connection through the housing 96. A miniature lamp 33 is disposed in the housing 96 substantially on the axis of revolution of the compass card 101 such that the magnetic effect of the filament in the incandescent lamp 33 has a minimal effect upon the compass card 101. A mirror ring 51 is disposed at the lip of the housing 96 about the periphery of the compass card 101 for reflecting light from the lamp 33 onto the front face of the compass card 101.

A cylindrical battery housing 112 is fixedly secured to a rubber wrist strap 113 by a pair of electrically conductive screws 114 serving as portions of electrical feedthroughs 115 passing into the battery compartment 35 for making electrical connections to the battery 34. A pair of wires interconnect the feedthrough screws 114 with the respective terminals 111 on the compass housing 96. The wires are suitably insulated to prevent inadvertent shorting thereof. Terminal bar 47, as previously described, is connected to one of the terminals 114, whereas the spring 45 is connected to the other terminal. Depressing the button 38 completes the electrical circuit, as previously described, for energizing the lamp 33 to illuminate the front fluorescent face 24 of the compass card 101. As previously described with regard to the other embodiments of the present invention, the compass card 101 includes the fluorescent background 24 and the contrasting black or dark indicia 25 overprinted thereon. Likewise, the rotary cursor 104 includes an annular front face portion 117 having a fluorescent background 118 and dark or black color indicia 119 overprinted thereon.

THe strap 113 is pivotably connected via pins 121 to the housing 96 in the same manner that the wrist strap of a watch is connected to the casing of a wrist watch. A bukle 122 buckle affixed to one end of the wrist strap 113 for buckling the strap to the wrist of the diver. As in the other embodiments, the relative large area of fluorescent background 24 with contrasting numerals or indicia provides increased visibility of the compass under conditions of poor visibility and low ambient light intensity by momentarily depressing the switch button 38 for energizing the lamp 33 and reactivating the fluorescent face or background 24 of the compass card 101.

Figure 9:
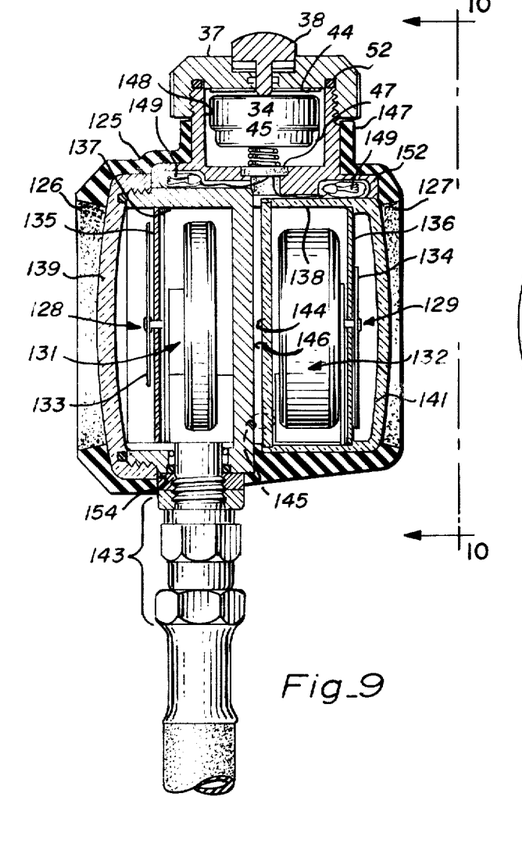
FIG. 9 is a view similar to that of FIG. 3 depicting an alternative embodiment of the present invention.
Figure 10:
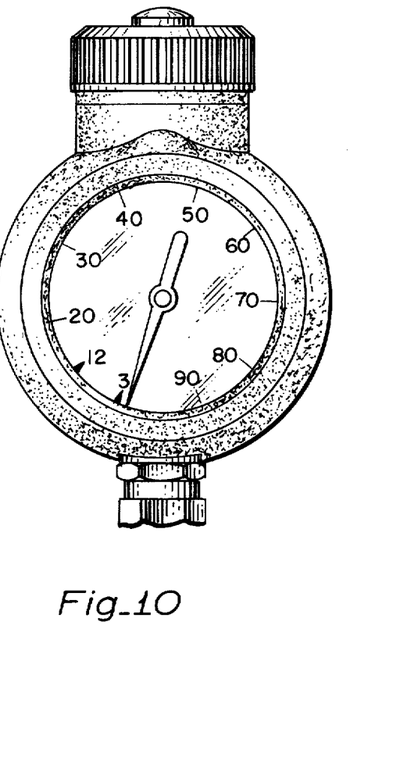
FIG. 10 is a view of the structure of FIG. 9 taken along line 10—10 in the direction of the arrows.

Referring now to FIGS. 9 and 10, there is shown an alternative embodiment of the dual pressure gauge structure of FIG. 3. More specifically, in the embodiment of FIG. 9, the structure is similar to that of FIG. 3 with the exception that the housing 125 is made of a one piece molded construction of a pliable, resilient, plastic material such as 50 duro neoprene rubber. The housing 125 is generally cylindrical and pliable having a pair of openings 126 and 127 at opposite ends thereof for viewing of the dial faces 128 and 129, respectively, of pressure gauge measuring elements 131 and 132, respectively. Each of the gauges 131 and 132 includes the pressure measuring elements such as a bourdon tube coupled to an indicating pointer 133 and 134, respectively, movable in front of the luminescent dial faces 128 and 129, respectively, having a luminescent background with black dial numerals and scale marks printed thereon.

Each of the measuring instruments 131 and 132 is contained within its own sealed container (capsule) 137 and 138, respectively. The capsules 137 and 138 are carried within the housing 125 in back-to-back relation such that their dial faces face outwardly of the housing 125 for viewing through the openings 126 and 127. The capsules 137 and 138 are preferably made of a transparent plastic and include at least a transparent front cover portions 139 and 141, respectively.

In the case illustrated, the pressure measuring instrument 131 is a gauge for measuring the pressure of breathing fluid contained in a diving tank and is connected in fluid communication with the diving tank via the intermediary of a flexible hose 142 and rotatable coupling fittings 143. The other gauge 132 is a pressure measuring gauge for indicating the depth to which the diver has descended. This gauge capsule 138 includes a flexible diaphragm portion 144 for transmitting ambient fluid pressure to the fluid medium inside the pressure measuring gauge 132. A hole 145 is provided in the side of the housing 125 to permit fluid pressure to communicate with the space 146 between the two measuring gauges 131 and 132 and thus to the diaphragm 144.

The housing includes a smaller generally cylindrical chamber portion 147 intersecting with the main body portion at substantially right angles at the top thereof to receive a generally cylindrical battery capsule 148. Battery capsule 148 is substantially the same as that previously described with regard to FIG. 3 with the exception that it is molded, as an integral unit, of a clear plastic material, such as lucite, havng a pair of incandescent light bulbs 149 embedded therein. The bulbs 149 are connected by wires to the electrical contacting bus 47 and to the conductive spring 45 such that when the actuating button 38 is depressed the conductive washer 44 is pressed into engagement with the upper end of the bar 47 thereby completing the electrical circuit through the bulbs 149 and battery for illuminating the faces 128 and 129 of the respective measuring gauges 131 and 132. The bulbs 149 are embedded in foot portions 151 and 152 of the battery capsule 148, such foot portions projecting generally axially of the housing 125 and having a curved surface abutting the cylindrical capsules 137 and 138, respectively, of the respective gauges 131 and 132.

The battery capsule 148, and the two gauge capsules 137 and 138 are readily assembled within the elastic and pliable housing 125 by first inserting the battery capsule 148, with the cap removed, into the cylindrical portion 147 from the central opening of the housing 125. With the battery capsule 148 in place, the tank pressure gauge 131 with the hose 142 secured thereto is assembled by threading the free end of the hose, with the gauge attached, through an opening 154 in the bottom side wall of the housing 125. The hose is then pulled through and the opening 154 and the attached gauge capsule 137 pressed into position as shown in FIG. 9. Due to the elastic nature of the housing 125, the housing grips the outer periphery of the gauge capsule 137. The depth gauge capsule 138 is then pressed into position as shown in FIG. 9 through the opening 127 in housing 125. Due to the elastic nature of the housing 125 the respective gauge capsules 137 and 138 and the battery capsule 148 are held in position. If it becomes desirable to replace any one of the gauge or battery capsules, the unit is readily disassembled by following the reverse steps of the assembly procedure, the defective element replaced and then the assembly reassembled. In addition, the elastic rubber housing 125 serves as a shock mounting for the respective gauge capsules 137 and 138.

Figure 11:
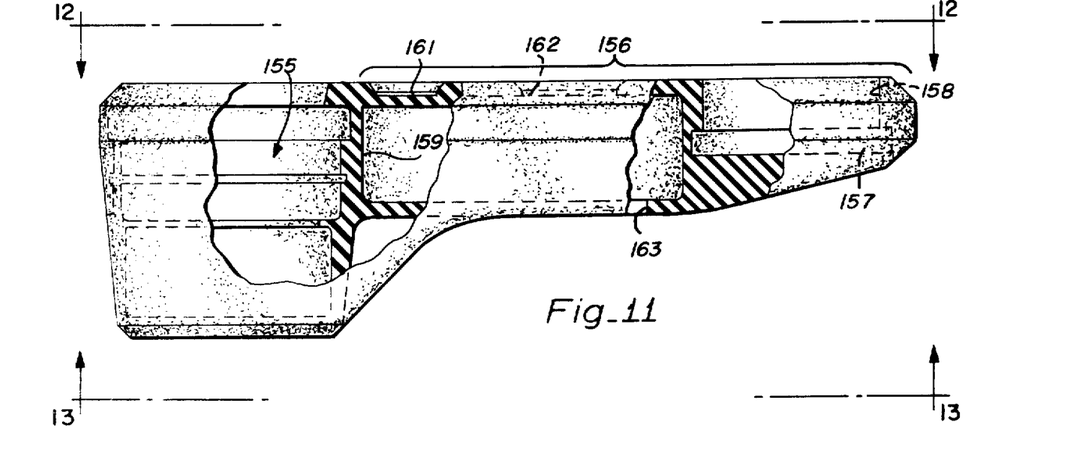
FIG. 11 is a side view, partly broken away, of an alternative embodiment of the present invention.
Figure 12:
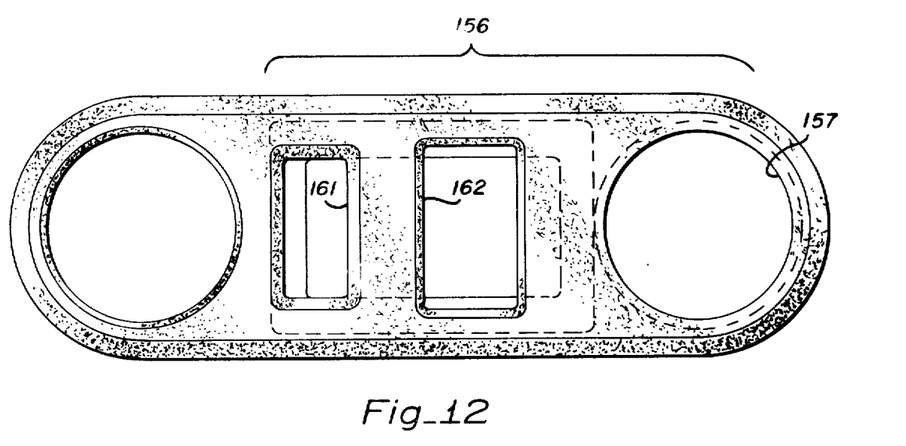
FIG. 12 is a top view of the structure of FIG. 11 taken along line 12—12 in the direction of the arrows.
Figure 13:
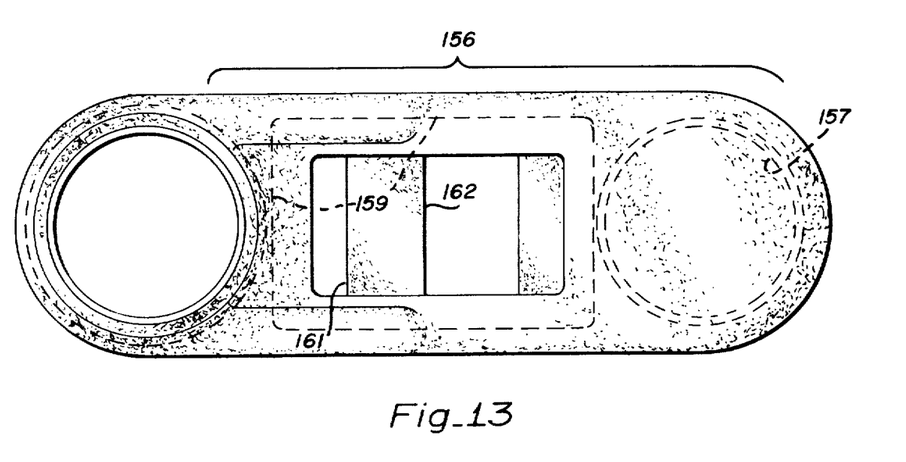
FIG. 13 is a botton view of the structure of FIG. 11 taken along line 13—13 in the direction of the arrows.

Referring now to FIGS. 11-13, there is shown an alternative housing embodiment incorporating features of the present invention. The housing of FIGS. 11-13 is made of a pliable resilient plastic material such as neoprene rubber and is molded as one piece to provide, at one end, a generally hollow cylindrical portion 155 substantially identical to the housing of FIGS. 9 and 10 with the exception that the combined battery lighting container assembly is replaced by an extension of the housing 156. The extension 156 extends laterally from the cylindrical housing portion 155. Elongated housing portion 156 includes a cylindrical cavity portion 157 at its outer end to receive a diving measuring instrument, such as a compass. An opening 158 communicates with the cavity 157 to allow viewing of the dial or face of the compass, now shown, as mounted within the cavity 157.

A centrally disposed generally rectangular cavity 159 is provided in the lateral extension 156 intermediate the cylindrical portion 155 and the cavity 157. The cavity is dimensioned to receive a generally rectangular decompression gauge, not shown, having a pair of rectangular openings 161 and 162 in the upper wall thereof for allowing the diver to view the indicating dials on the gauge when inserted within the rectangular chamber 159. A generally rectangular opening 163 is provided on the bottom wall of the lateral extension 156, communicating with the rectangular chamber 159, to permit insertion and, if desired, removal of the decompression gauge through opening 163 by stretching the resilient housing and pressing the gauge capsule into position within the cavity 159.

The tank pressure gauge 131 and the depth gauge 132 are inserted within the generally cylindrical cavity 155 in the manner as previously described with regard to the housing of FIGS. 9 and 10. The advantage to the housing of FIGS. 11–13 is that it allows a number of important measuring devices for the diver to be clustered into one housing which is tethered to the divers breathing tank via the breathing hose 142, as shown in FIGS. 9 and 10.

What is claimed is:

1. In a portable underwater indicating instrument to be carried by and for use by a diver:
    first and second measuring means for measuring first and second quantities of interest to the diver;
    first and second indicating means coupled to said respective first and second measuring means for indicating said first and second respective measured quantities to the diver;
    housing means common to and for housing said first and second measuring and indicating means;
    each of said indicating means including a face portion facing outwardly of said housing for viewing by the diver; and
    said housing means including first chamber means open at opposite ends to receive and retain said first and second measuring and indicating means in back-to-back relation with their respective face portions facing outwardly of said housing means in opposite directions for viewing by the diver.

2. The apparatus of claim 1 wherein, said housing includes a pair of openings therein for viewing of said indicating means by the diver.

3. The apparatus of claim 1 wherein, said housing is made of pliable elastic material.

4. The apparatus of claim 3 including first and second capsule means for separately encapsulating said first and second measuring and indicating means, in a fluid tight manner, and wherein said first and second capsule means are retained within said elastic housing.

5. The apparatus of claim 3 wherein, said elastic housing includes a chamber portion thereof to receive and retain therewithin an illuminating means for illuminating said indicating means, said illuminating means including; light bulb means for illuminating, when energized, said indicating means, battery container means for containing a battery to be connected for energizing said light bulb means, switch means connected in circuit with the battery and said bulb means for controlling the energization of said light bulb means, and means for embedding said bulb means in a portion of said battery container means.

6. The apparatus of claim 5 wherein, said means for embedding said bulb means comprises a translucent material.

7. The apparatus of claim 1 wherein, said first measuring and indicating means for measuring and indicating a first quantity to the diver includes a fluid pressure measuring and indicating means for measuring and indicating the fluid pressure within a tank of pressurized breathing fluid for use by the diver and adapted to be connected to a hose means for providing a flexible fluid passageway communicating between the tank and said tank pressure measuring means.

8. The apparatus of claim 4 wherein, said second measuring and indicating means includes means for measuring and indicating the water depth.

9. The apparatus of claim 1 wherein, said second measuring and indicating means comprises a compass.

10. The apparatus of claim 1 wherein, said housing means includes an elongated portion extending laterally from said first chamber means to a free end portion, said elongated portion including an open ended chamber in said free end portion thereof to receive and retain a measuring and indicating means having a face portion for facing outwardly of said housing means through said open end of said chamber for viewing by the diver.

11. The apparatus of claim 10 wherein, said elongated portion of said housing includes a second chamber therein disposed intermediate the length of said elongated extension portion for receiving and retaining an indicating and measuring means, said housing having an opening communicating with said second chamber for viewing of the face of an instrument to be contained within said second chamber.

12. A portable housing to be carried by a diver for containing underwater diving instruments for indicating diving conditions to the diver;
    housing means common to and for housing a pair of diving instruments;
    said housing means having a pair of openings therein for viewing the faces of the pair of diving instruments as contained in said common housing means; and
    said housing means including first chamber means open at opposite ends to receive and retain said first and second measuring and indicating means in back-to-back relation with their respective face portions facing outwardly of said housing means in opposite directions for viewing by the diver.

13. The apparatus of claim 12 wherein, said housing is made of a pliable elastic material.

14. The apparatus of claim 12 wherein, said housing means includes an elongated portion extending laterally from said first chamber means to a free end portion, said elongated portion including an open ended chamber in said free end portion thereof to receive and retain a measuring and indicating means having a face portion for facing outwardly of said housing means through said open end of said chamber for viewing by the diver.

15. The apparatus of claim 14, wherein, said elongated portion of said housing includes a second chamber therein disposed intermediate the length of said elongated extension portion for receiving and retaining an indicating and measuring means, said housing having openings communicating with said second chamber for viewing of the face of an instrument to be contained within said second chamber.

* * * * *